United States Patent
Banas et al.

(10) Patent No.: US 8,250,933 B2
(45) Date of Patent: Aug. 28, 2012

(54) METHOD AND SYSTEM FOR MEASUREMENT OF A FLOW RATE OF A FLUID

(75) Inventors: John M. Banas, Warren, MA (US);
Brian P. Demarey, Bondsville, MA (US); John O. Gerety, Newton, CT (US); John M. Holmes, Southwick, MS (US); Joseph W. Quinn, Bloomfield, CT (US); Edward S. Sadlon, Simsbury, CT (US)

(73) Assignee: ALSTOM Technology Ltd, Baden (CH)

( * ) Notice: Subject to any disclaimer, the term of this patent is extended or adjusted under 35 U.S.C. 154(b) by 65 days.

(21) Appl. No.: 12/749,783

(22) Filed: Mar. 30, 2010

(65) Prior Publication Data
US 2011/0239782 A1    Oct. 6, 2011

(51) Int. Cl.
*G01F 1/42* (2006.01)
(52) U.S. Cl. .................................................. 73/861.61
(58) Field of Classification Search ............... 73/861.61, 73/861.355–861.357
See application file for complete search history.

(56) References Cited

U.S. PATENT DOCUMENTS

| 6,505,519 B2 * | 1/2003 | Henry et al. ............. 73/861.356 |
| 7,152,460 B2 * | 12/2006 | Gysling et al. ................. 73/32 A |
| 2007/0240778 A1 | 10/2007 | Bassi et al. |

FOREIGN PATENT DOCUMENTS

| EP | 2143997 | 1/2010 |
| WO | WO2009/145614 | 12/2009 |

OTHER PUBLICATIONS

PCT International Search Report and the Written Opinion of the International Searching Authority dated Oct. 6, 2011—(PCT/US2010/024048).

* cited by examiner

*Primary Examiner* — Jewel V Thompson
(74) *Attorney, Agent, or Firm* — Robert D. Crawford

(57) ABSTRACT

A system for measuring a flow rate of a fluid through a plurality of tubes sharing a common flow orifice, the system includes an ultrasonic transducer having a plurality of sensors in communication with a plurality of tubes sharing a common flow orifice. The system includes an electronic module coupled to the ultrasonic transducer, the electronic module connecting selected sensors to a flow rate analyzer for determining a flow rate of fluid through the plurality of tubes on which the sensors are in communication with.

20 Claims, 4 Drawing Sheets

METHOD AND SYSTEM FOR MEASUREMENT OF A FLOW RATE OF A FLUID

BACKGROUND

1. Field

The present disclosure generally relates to boiler wall tubes. Specifically, the present disclosure relates to a method and a system for measurement of a flow rate of fluid through the boiler wall tubes.

2. Related Art

The rate at which a fluid flows ("flow rate") through fluid wall panels in boilers may be controlled by grouping tubes in a manner to share a common orifice. For example, a group of tubes may share a common orifice (often referred to as a "header") and a series of bifurcations is introduced to distribute the fluid into progressively narrower tubes until the final tube dimension is achieved. Bifurcations are primary tube splits in which the fluid is expected to be equally distributed into the resulting tubes.

Measurement of the flow rate of the fluid through the tubes is often desired to ensure equal distribution of the fluid at the bifurcation. Standard equipment for the measurement of fluid flow through the tubes is typically a single flow channel measurement. However, the single flow channel measurement of a single tube does not permit an easy determination of whether the fluid is equally distributed at the bifurcation.

For example, when utilizing a single flow channel measurement, to determine equal distribution of the fluid at the bifurcation, measurement of the flow of a fluid in each tube and comparison of the flow rates of each tube would be required. Any alteration to the flow rate, the bifurcation, the orifice, or the combination thereof, would be conducted after the individual measurements were taken and analyzed. Such measurement and analysis is onerous, time consuming and expensive. Accordingly, there is a need to simplify the measurement and comparison of flow rates of fluids within tubes of wall panels within boilers.

SUMMARY

According to aspects illustrated herein, there is provided a system for measuring a flow rate of a fluid through a plurality of tubes sharing a common flow orifice, the system comprising an ultrasonic transducer having a plurality of sensors, the sensors in communication with a plurality of tubes sharing a common flow orifice; an electronic module coupled to the ultrasonic transducer, the electronic module connecting selected sensors to a flow rate analyzer for determining a flow rate of fluid through the plurality of tubes on which the sensors are in communication with.

According to other aspects illustrated herein, there is provided a method for determining whether a fluid is evenly distributed through at least two tubes in a water panel of a boiler, the method comprising positioning a first plurality of sensors on a first tube, the sensors for measuring a flow rate of fluid through the first tube; positioning a second plurality of sensors on a second tube, the sensors for measuring the flow rate of fluid through the second tube, wherein the second tube shares a common flow orifice with the first tube; coupling the first plurality of sensors and the second plurality of sensors to an electronic module having a flow rate analyzer, the electronic module receives the flow rate measurements from the first plurality of sensors and the second plurality of sensors; and comparing the flow rate measurement from the first plurality of sensors and the flow rate measurement of the second plurality of sensors, thereby determining whether the fluid is evenly distributed by the common flow orifice to the first tube and the second tube.

According to other aspects illustrated herein, there is provided a method for measuring a flow rate of a fluid through tubes sharing a common flow orifice, the method comprising positioning a plurality of sensors in communication with a plurality of tubes sharing a common flow orifice, the sensors coupled to an ultrasonic transducer; coupling the ultrasonic transducer to an electronic module, the electronic module connecting a set of sensors to a flow rate analyzer, the sensors and flow rate analyzer measure a flow rate of fluid through the plurality of tubes on which the selected sensors are in communication with.

The above described and other features are exemplified by the following figures and detailed description.

BRIEF DESCRIPTION OF THE DRAWINGS

Referring now to the figures, which are exemplary embodiments, and wherein the like elements are number alike.

DETAILED DESCRIPTION

Figure 1:
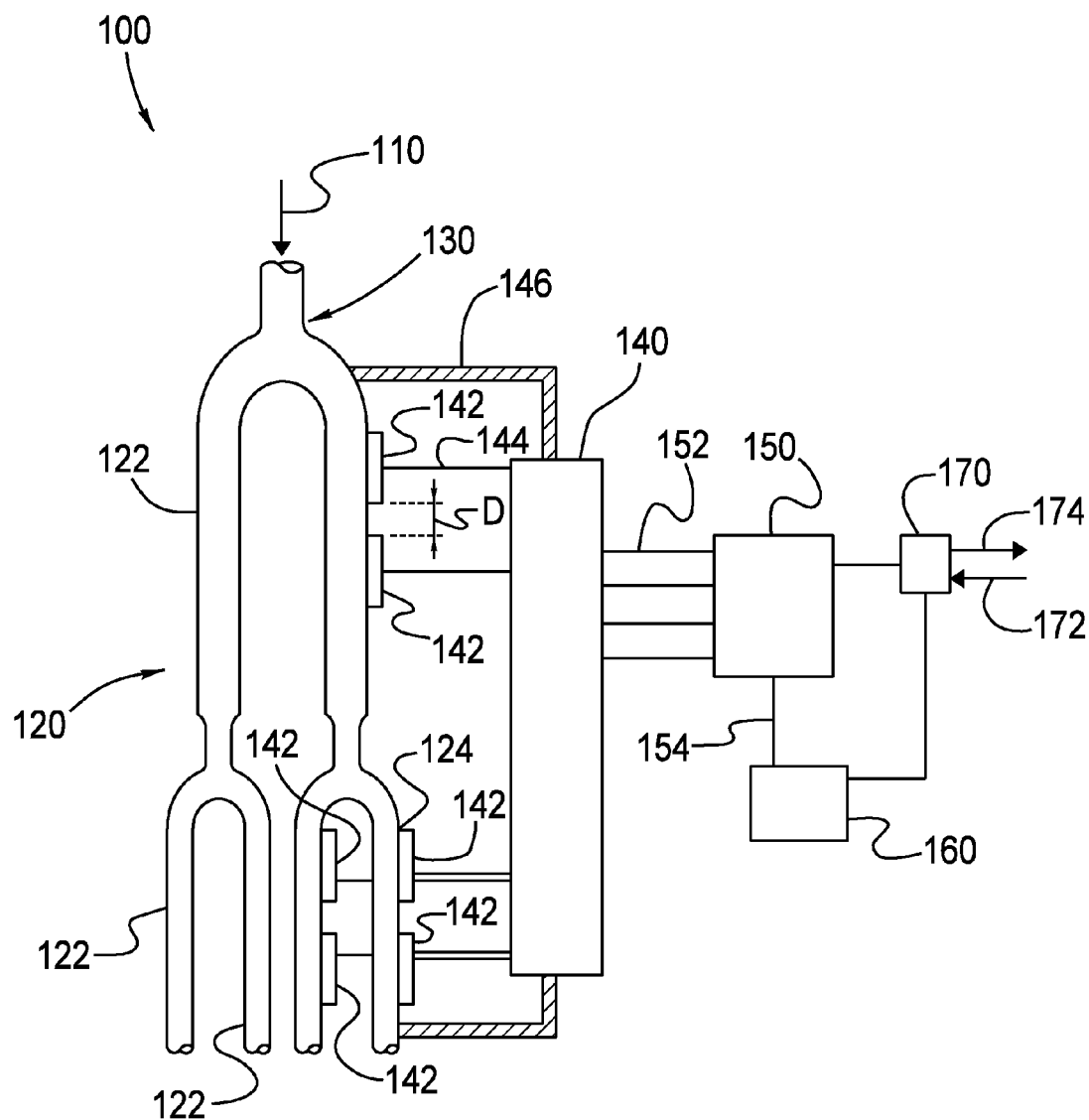
FIG. 1 is a schematic view of a portion of one embodiment of the system disclosed herein.

FIG. 1 illustrates a system 100 for measuring a flow rate of a fluid 110 through a plurality of tubes 120. The plurality of tubes 120 share a common flow orifice 130 through which the fluid 110 flows. The fluid 110 may be any type of fluid desired by a user of the system 100, including, but not limited to, clean water, waste water, and the like.

In one embodiment the system 100 may be used in a water panel of a boiler. However, it is contemplated that the system 100 may be utilized in any system that employs a plurality of tubes and/or ducts that would benefit from the measurement of a flow rate of a fluid, such as, but not limited to, water distribution systems in buildings, and the like.

The common flow orifice 130 is utilized to provide the fluid 110 to each of the tubes 122, which as shown in FIG. 1, are successively bifurcated until the desired diameter is obtained. Typically, in a water panel of a boiler, the bifurcation produces four (4) tubes 122 that share a common flow orifice 130 and share a common flow rate of the fluid 110. While not shown in FIG. 1, it is contemplated that a full water panel in a boiler will contain many groupings of the plurality of tubes 120.

To ensure each of the tubes 122 share the same flow rate of the fluid 110, i.e., that the fluid is evenly distributed from the common flow orifice 130 throughout the tubes, the system 100 includes an ultrasonic transducer 140 having at least one sensor 142. As shown in FIG. 1, the system includes several sensors 142, which are in communication with the plurality of tubes 120 that share the common flow orifice 130.

The sensors 142 are capable of measuring a rate of fluid 110 that flows (the "flow rate") past the sensor in the tube 122. The flow rate measured by the sensor 142 is provided to the ultrasonic transducer 140 as shown by line 144. In one embodiment, the sensors 142 are ultrasonic (UT) sensors, however, it is contemplated that other types of sensors may be used, including, but not limited to, flow sensors such as mass flow sensors and water meters, video sensors, and the like. Combinations of different types of sensors 142 are also contemplated. When the sensors 142 are UT sensors, the sensors are placed in contact with the surface 124 of the tubes 122, which facilitates the sound pulse to enter and exit the flow path of the fluid 110 through the tube.

In one embodiment, the sensors 142 are in communication with the plurality of tubes 120 by being positioned on a surface 124 of the tube 122 so there is contact between the surface of the tube and the sensor. However, it is contemplated that in another embodiment, the sensors 142 may be placed inside each of the tubes 122. Alternatively, the sensors 142 may be placed near the surface 124 of the tubes 122, but not in contact with the surface.

Figure 2:
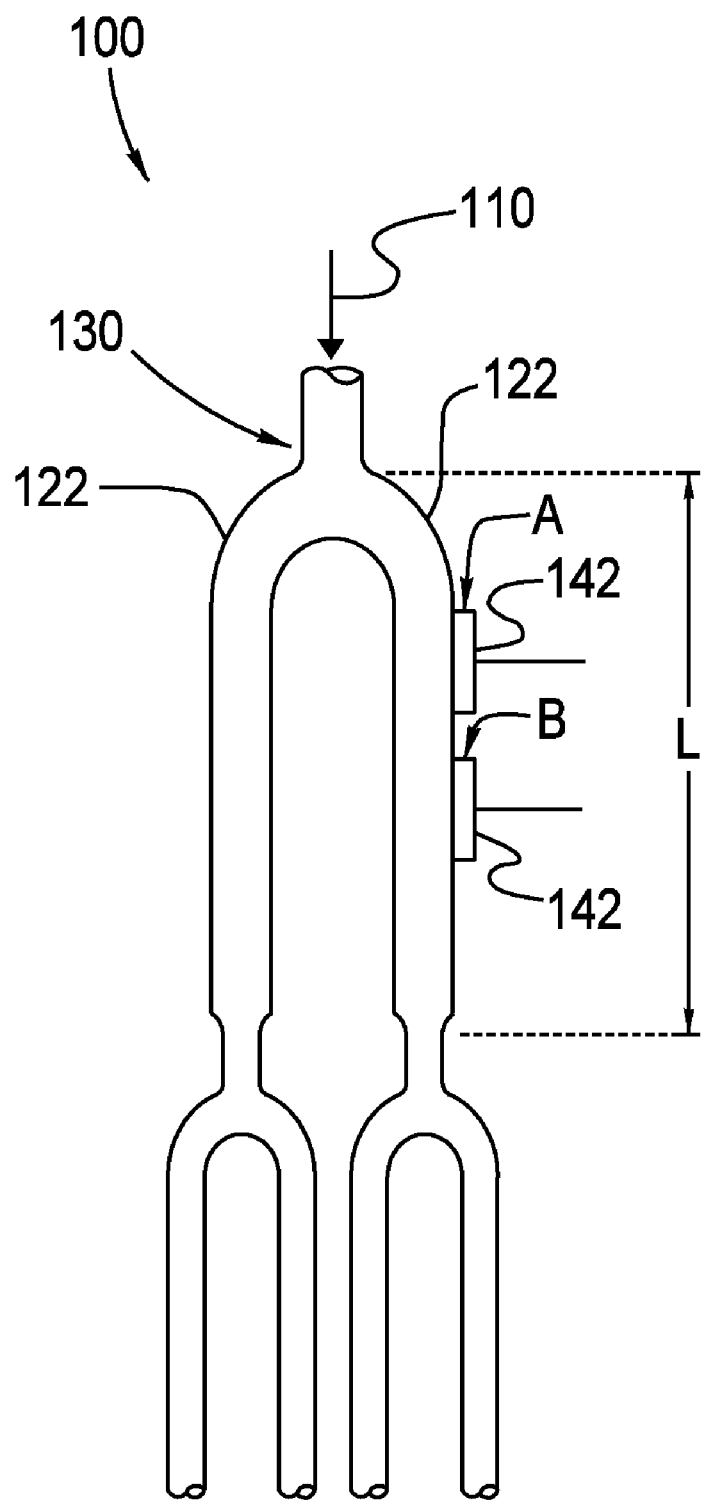
FIG. 2 is a schematic view of a portion of one embodiment of the system disclosed herein.

As shown in FIG. 1, at least two sensors 142 may be in communication with each tube 122. In one embodiment, as shown in FIG. 2, a first sensor 142 is positioned at a first location A along a length L of a tube 122, and a second sensor 142 is positioned at a second location B along the length L of the same tube 122. Each of the tubes 122 in the plurality of tubes 120 may include a first sensor 142 at location A and a second sensor 142 at location B. However, it is also contemplated that other sensors 142 may be placed on one or more tubes 122 at different locations.

Referring back to FIG. 1, in one embodiment, the ultrasonic transducer 142 is coupled to the plurality of tubes 120 by a mounting fixture 146. The mounting fixture 146 may include brackets and support members. The mounting fixture 146 holds the ultrasonic transducer 140 in place and coupled to the plurality of tubes 120. The mounting fixture 146 may facilitate placing the sensors 142 into contact with the plurality of tubes 120 and maintaining the proper pressure to allow the sensors to measure the flow of the fluid 110 through the tube 122.

In one embodiment, the mounting fixture 146 provides alignment of the sensors 142 along the length L of each tube 122 in the plurality of tubes 120. Specifically, the mounting fixture 146 aligns two sensors 142 on one tube 122 at the first location A and a second location B, where the two sensors are separated by a precise separation distance D. Separation distance D may be any distance desired by the user, however it is contemplated that separation distance D remains constant throughout the system 100. In one example, the separation distance D is between about 0.1 centimeter (cm) to about 100 cm (0.1 cm-100 cm). In another example, the separation distance D is between about 1 cm to about 100 cm (1 cm-100 cm). In yet a further example, the separation distance D is between about 10 cm to about 100 cm (10 cm-100 cm). In another example, the separation distance D is between about 1 cm and about 50 cm (1 cm-50 cm). In a further example, the separation distance D is between about 1 cm and about 25 cm (1 cm-25 cm).

Still referring to FIG. 1, the ultrasonic transducer 140 is coupled to an electronic module 150. The electronic module 150 couples the sensors 142 to a flow rate analyzer 160 for determination of a flow rate of fluid 110 through the plurality of tubes 120 on which the sensors 140 are in communication with. While the flow rate analyzer 160 is illustrated as a separate device in FIG. 1, it is contemplated that both the electronic module 150 and the flow rate analyzer 160 may be contained in a single device, i.e., not separate from one another. Both the electronic module 150 and the flow rate analyzer 160 may be coupled to a controller 170, which may be, for example, a data processing unit capable of receiving input 172 from a user and providing output 174 to a user.

The electronic module 150 may be any device capable of receiving measurements from the sensors 142 and facilitating the transfer of the measurements to the flow rate analyzer 160. As shown in FIG. 1, in one embodiment the electronic module 150 has four (4) input channels 152 which couples the electronic module to the ultrasonic transducer 140, however it is contemplated that the electronic module may have more or less input channels as illustrated herein. The electronic module 150 may also have a communication link 154 which couples the electronic module to the flow rate analyzer 160.

In one embodiment, to determine whether the flow rate of the fluid 110 is the same in all of the tubes 122 in the system 100, measurements of the flow rate of the fluid obtained by the sensors 142 is provided to the flow rate analyzer 160. The measurements of the flow rate of the fluid 110 are provided to the ultrasonic transducer 140 and subsequently provided to the electronic module 150 prior to being provided to the flow rate analyzer 160.

Figure 3:
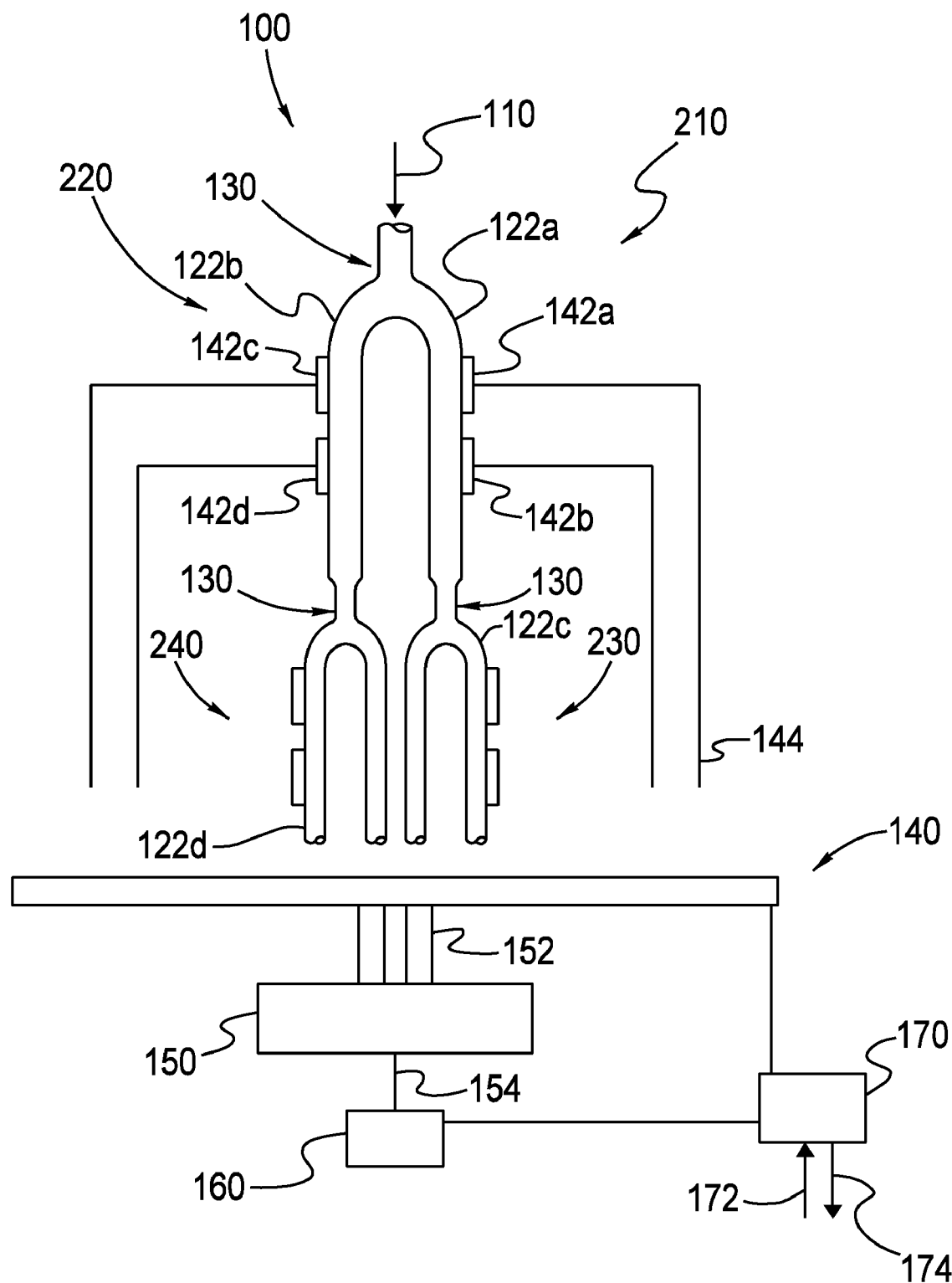
FIG. 3 is a schematic view of a portion of one embodiment of the system disclosed herein.

FIG. 3 illustrates a plurality of tubes 120 having a first tube 122a and a second tube 122b that share a common flow orifice 130. To determine whether the fluid 110 is equally distributed by the common flow orifice 130 to the first tube 122a and the second tube 122b a first plurality 210 of sensors 142 is positioned on the first tube and a second plurality 220 of sensors 142 is positioned on the second tube 122b. The first plurality 210 of sensors on the first tube 122a includes two sensors 142a and 142b while the second plurality 220 of sensors on the second tube 122b includes two sensors 142c and 142d.

Each plurality 210, 220 of sensors includes at least two sensors where there is a precise separation distance D between the sensors. The separation distance D is determined by the user prior to positioning the sensors 142 on the tubes. The separation distance D is provided to the electronic module 150, the flow rate analyzer 160 and/or the controller 170 to enable determination of whether the first tube 122a and the second tube 122b have the same flow rate of the fluid 110.

The first plurality 210 of the sensors 142 and the second plurality 220 of the sensors are coupled to an electronic module 150. As shown in FIG. 3, the first plurality 210 of sensors 142 and the second plurality of the sensors are coupled to the electronic module through the ultrasonic transducer 140. The electronic module 150 receives measurements taken by the sensors 142 of the first plurality 210 and the second plurality 220.

To determine whether the flow rate of the fluid 110 in the first tube 122a is the same as the flow rate of the fluid in the second tube 122b, the flow rate measurements from the first plurality 210 of the sensors 142 are compared to the flow rate measurements from the second plurality 220 of the sensors. In one embodiment, the comparison of the flow rate measurements is conducted in the flow rate analyzer 160. However, it is contemplated that the comparison of the flow rate measurements may be conducted in the electronic module 150 or the controller 170.

Figure 4:
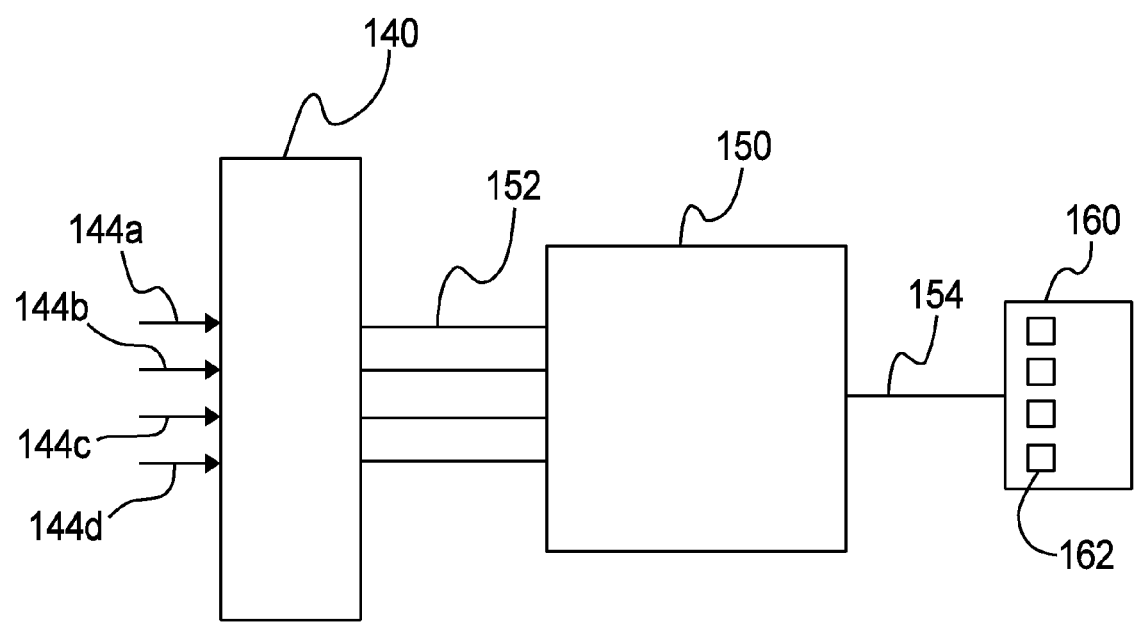
FIG. 4 is a schematic view of control devices according to one embodiment of the system disclosed herein.

To ensure the flow rate measurements from the first plurality 210 of the sensors 142 is compared to the flow rate measurements from the second plurality 220 of the sensors, the measurements are correlated to the corresponding tube from which they are taken. For example, as shown in FIG. 4, there are at least four measurements, shown as lines 144a, 144b, 144c and 144d, which are provided from the corresponding sensors 142a-d to the ultrasonic transducer 140. In one embodiment, the measurements are provided to the electronic module 150 (via one or more input channels 152), where the measurements taken by the sensors 142 of the first plurality 210 are correlated to the first tube 122a while the flow rate measurements taken by the sensors 142 of the second plurality 220 are correlated to the second tube 122b. In another embodiment, the correlation is performed by the electronic module 150, however it is contemplated that the correlation may be performed by the controller 170.

Correlation of the flow rate measurement of the first plurality 210 of the sensors 142 to the first tube 122a and the flow rate measurement of the second plurality 220 of the sensors to the second tube 122b includes generating a unique sensor identification value 162 for each measurement provided by the sensors. The unique sensor identification values 162 are generated by a multiplexer feature of the electronic module 150. The unique sensor identification values 162 are either analog or digital. Each of the unique sensor identification values 162 is retained in the flow rate analyzer 160.

It is contemplated that the system 100 illustrated in FIG. 3 may include other pluralities of sensors 142 positioned on other tubes throughout the system, however for illustration purposes, only two sets of sensors and two tubes are shown in FIG. 3. For example, it is contemplated having a third plurality 230 of sensors 142 positioned on a third tube 122c and a fourth plurality 240 of sensors 142 positioned on a fourth tube 122d, which shares a common flow orifice 130 with the third tube 122c.

As is done with the first two pluralities 210, 220 of the sensors, the measurements taken from the sensors 142 in the third and fourth pluralities 230, 240 are correlated to the respective tubes 122c and 122d. Correlation of the measurements to the respective tubes 122c and 122d includes generating a unique sensor identification value for each measurement and retaining the unique sensor identification values in the flow rate analyzer 160.

By grouping the measurements on the basis of common flow orifice, the measurements permit a user to determine whether two tubes 122 have the same flow rate of the fluid 110. If the flow rate in one or more tubes 122 is different than expected, appropriate action, such as shut off of the tube(s) in question, may be taken.

While the invention has been described with reference to various exemplary embodiments, it will be understood by those skilled in the art that various changes may be made and equivalents be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for determining a flow rate of a fluid passing through a plurality of tubes wherein a main tube is bifurcated into a first set of tubes and a second set of tubes, whereby each of the first and second set of tubes includes a primary tube which is bifurcated to provide a corresponding pair of secondary tubes, the system comprising:
a plurality of sensors in communication with two of the tubes of each of the first and second set of tubes, each of the sensors providing a signal indicative of the flow rate of the fluid passing through the corresponding tube;
a flow rate analyzer that receives the signals from the plurality of sensors and determines the flow rate of fluid through each of the plurality of tubes of the first and second set of tubes including tubes having no sensor in communication therewith.

2. A system according to claim 1, wherein each sensor includes at least two ultrasonic sensors positioned on each corresponding tube of the plurality of tubes.

3. A system according to claim 2, wherein the at least two ultrasonic sensors are positioned on a surface of each corresponding tube of the plurality of tubes.

4. A system according to claim 1, wherein the corresponding sensors are in communication only with one primary tube and one secondary tube of each first and second set of tubes.

5. A system according to claim 1, wherein the corresponding sensors are in communication only with two tubes of each first and second set of tubes.

6. A system according to claim 1, wherein each sensor is an ultrasonic sensor.

7. A system according to claim 1, wherein the analyzer determines an abnormality in the fluid flow through any of the plurality of tubes in response to the flow rate determined by the plurality of sensors.

8. A system according to claim 1, wherein the analyzer determines a difference in flow rate of fluid passing through similar tubes in response to the flow rate determined by the plurality of sensors.

9. A system according to claim 1, further comprising a mounting fixture to position simultaneously the plurality of sensors on the corresponding tubes.

10. A method for determining the flow rate of fluid passing through a plurality of tubes, wherein the plurality of tubes includes a main tube bifurcated into a first set of tubes and a second set of tubes, whereby each of the first and second set of tubes includes a primary tube which is bifurcated to provide a corresponding pair of secondary tubes, the method comprising:
positioning a plurality of sensors in communication with two of the tubes of each of the first and second set of tubes each of the sensors providing a signal indicative of the flow rate of the fluid passing through the corresponding tube; and
determining the flow rate of fluid through each of the plurality of tubes of the first and second set of tubes including tubes having no sensor in communication therewith.

11. A method according to claim 10, wherein each sensor is an ultrasonic sensor.

12. A method according to claim 10, further comprising positioning each sensor, which includes at least two ultrasonic sensors, on each corresponding tube of the plurality of tubes.

13. A method according to claim 12, wherein each ultrasonic sensor includes at least two ultrasonic sensors positioned on a surface of each corresponding tube of the plurality of tubes.

14. A method according to claim 10, further comprising positioning the corresponding sensors in communication only with one primary tube and one secondary tube of each first and second set of tubes.

15. A method according to claim 10, further comprising positioning the corresponding sensors in communication only with two tubes of each first and second set of tubes.

16. A method according to claim 10, further comprising determining an abnormality in the fluid flow through any of the plurality of tubes in response to the flow rate determined by the plurality of sensors.

17. A method according to claim 10, further comprising a difference in flow rate of fluid passing through similar tubes in response to the flow rate determined by the plurality of sensors.

18. A method according to claim 10, further comprising positioning simultaneously the plurality of sensors on the corresponding tubes using a mounting fixture.

19. A method for determining whether a fluid is evenly distributed through at least two tubes in a water panel of a boiler, the method comprising:

positioning a first plurality of sensors on a first tube, the sensors for measuring a flow rate of fluid through the first tube;

positioning a second plurality of sensors on a second tube the sensors for measuring the flow rate of fluid through the second tube, wherein the second tube shares a common flow orifice with the first tube;

coupling the first plurality of sensors and the second plurality of sensors to an electronic module having a flow rate analyzer, the electronic module receives the flow rate measurements from the first plurality of sensors and the second plurality of sensors;

comparing the flow rate measurement from the first plurality of sensors and the flow rate measurement of the second plurality of sensors, thereby determining whether the fluid is evenly distributed by the common flow orifice to the first tube and the second tube; and correlating the flow rate measurement of the first plurality of sensors to the first tube and the flow rate measurement of the second plurality of sensors to the second tube.

20. A method according to claim 19, wherein the correlation step further comprises:

generating a unique sensor identification value for each flow rate measurement provided by the sensors to the electronics module; and retaining the unique sensor identification values in the flow rate analyzer.

* * * * *